(12) United States Patent
Derby

(10) Patent No.: US 11,443,582 B2
(45) Date of Patent: Sep. 13, 2022

(54) VIRTUAL PAYMENT SYSTEM AND METHOD FOR DISPENSING FUEL

(71) Applicant: AVALAN WIRELESS SYSTEMS, INC., Madison, AL (US)

(72) Inventor: Michael Derby, Madison, AL (US)

(73) Assignee: Avalan Wireless Systems, Inc., Madison, AL (US)

(*) Notice: Subject to any disclaimer, the term of this patent is extended or adjusted under 35 U.S.C. 154(b) by 0 days.

(21) Appl. No.: 16/702,408

(22) Filed: Dec. 3, 2019

(65) Prior Publication Data

US 2020/0175803 A1    Jun. 4, 2020

Related U.S. Application Data

(60) Provisional application No. 62/774,389, filed on Dec. 3, 2018.

(51) Int. Cl.
| | |
|---|---|
| G07F 11/00 | (2006.01) |
| G07F 13/02 | (2006.01) |
| B67D 7/04 | (2010.01) |
| B67D 7/14 | (2010.01) |
| G06Q 20/20 | (2012.01) |
| G06Q 20/32 | (2012.01) |
| G07F 9/00 | (2006.01) |

(52) U.S. Cl.
CPC .............. *G07F 9/002* (2020.05); *B67D 7/04* (2013.01); *B67D 7/145* (2013.01); *G06Q 20/204* (2013.01); *G06Q 20/3278* (2013.01); *G07F 13/025* (2013.01)

(58) Field of Classification Search
CPC ... G07F 9/002; G07F 13/025; G06Q 20/3278; G06Q 20/204; B67D 7/145; B67D 7/04
See application file for complete search history.

(56) References Cited

U.S. PATENT DOCUMENTS

| | | | |
|---|---|---|---|
| 5,980,090 A | 11/1999 | Royal, Jr. et al. | |
| 7,082,406 B1 | 7/2006 | Dickson | |
| 8,032,414 B2* | 10/2011 | Payne | G06Q 30/0238 |
| | | | 705/14.53 |
| 9,135,615 B1* | 9/2015 | Mutha | G06Q 20/12 |
| 9,495,822 B2* | 11/2016 | McNinch | B67D 7/06 |
| 9,496,920 B2 | 11/2016 | Carapelli et al. | |
| 9,972,159 B2* | 5/2018 | Carapelli | G06Q 20/18 |
| 10,210,515 B2* | 2/2019 | Vienravee | G06Q 20/325 |
| 2009/0103725 A1* | 4/2009 | Tang | H04L 63/0823 |
| | | | 380/45 |

(Continued)

*Primary Examiner* — Michael Collins
(74) *Attorney, Agent, or Firm* — George P Kobler

(57) ABSTRACT

A system facilitating payment for fuel dispensing includes a fuel dispenser associated with a current-loop-to-ethernet converter for receiving serial data from a fuel dispenser controller and converting said serial data to an ethernet signal and a network appliance coupled the current-loop-to-ethernet converter by an ethernet port. A virtual payment facilitator is connected to the network appliance over a VPN and to a payment authorization entity, also over a VPN. A process performed by the system includes receiving a fueling request at the virtual payment facilitator from the payment authorization entity and converting that request into a command issued to the fuel dispenser to dispense fuel.

15 Claims, 7 Drawing Sheets

(56) References Cited

U.S. PATENT DOCUMENTS

| | | | |
|---|---|---|---|
| 2009/0129403 A1* | 5/2009 | Harrell | G07F 13/02 370/467 |
| 2010/0268612 A1 | 10/2010 | Berrio et al. | |
| 2010/0318463 A1* | 12/2010 | Reany | G06Q 20/04 705/44 |
| 2011/0022223 A1 | 1/2011 | Johnson, Jr. et al. | |
| 2011/0185319 A1* | 7/2011 | Carapelli | G07F 7/10 345/173 |
| 2012/0265683 A1* | 10/2012 | da Silva | G06Q 20/407 705/44 |
| 2012/0278454 A1* | 11/2012 | Stewart | H04L 67/34 709/220 |
| 2014/0337234 A1* | 11/2014 | Tang | G06Q 20/3278 705/71 |
| 2015/0106196 A1* | 4/2015 | Williams | G06Q 20/326 705/14.51 |
| 2015/0242969 A1* | 8/2015 | Pallas | G06Q 50/06 705/39 |
| 2016/0034899 A1* | 2/2016 | Myers | G07F 7/088 705/44 |
| 2017/0355588 A1* | 12/2017 | Fieglein | G07F 9/001 |
| 2017/0358040 A1* | 12/2017 | Williams | G06Q 50/06 |
| 2018/0009651 A1* | 1/2018 | Payne | G06Q 20/3224 |
| 2018/0012205 A1 | 1/2018 | Fieglein et al. | |
| 2018/0047014 A1* | 2/2018 | Maus | G06Q 20/341 |
| 2020/0236175 A1* | 7/2020 | Wang | G06Q 20/3278 |

\* cited by examiner

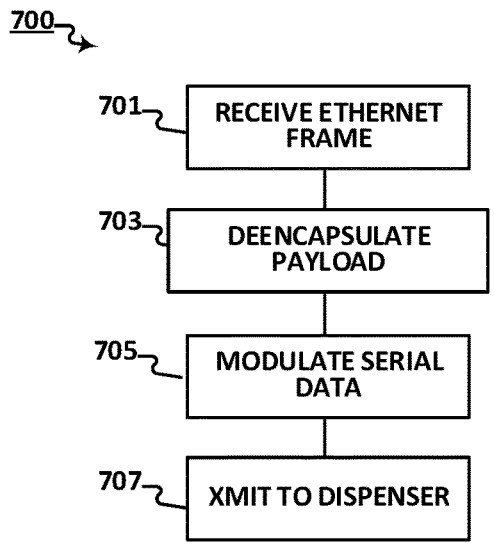
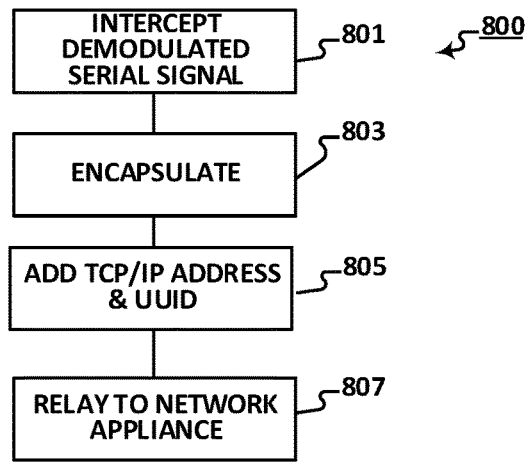
FIG. 7
FIG. 8
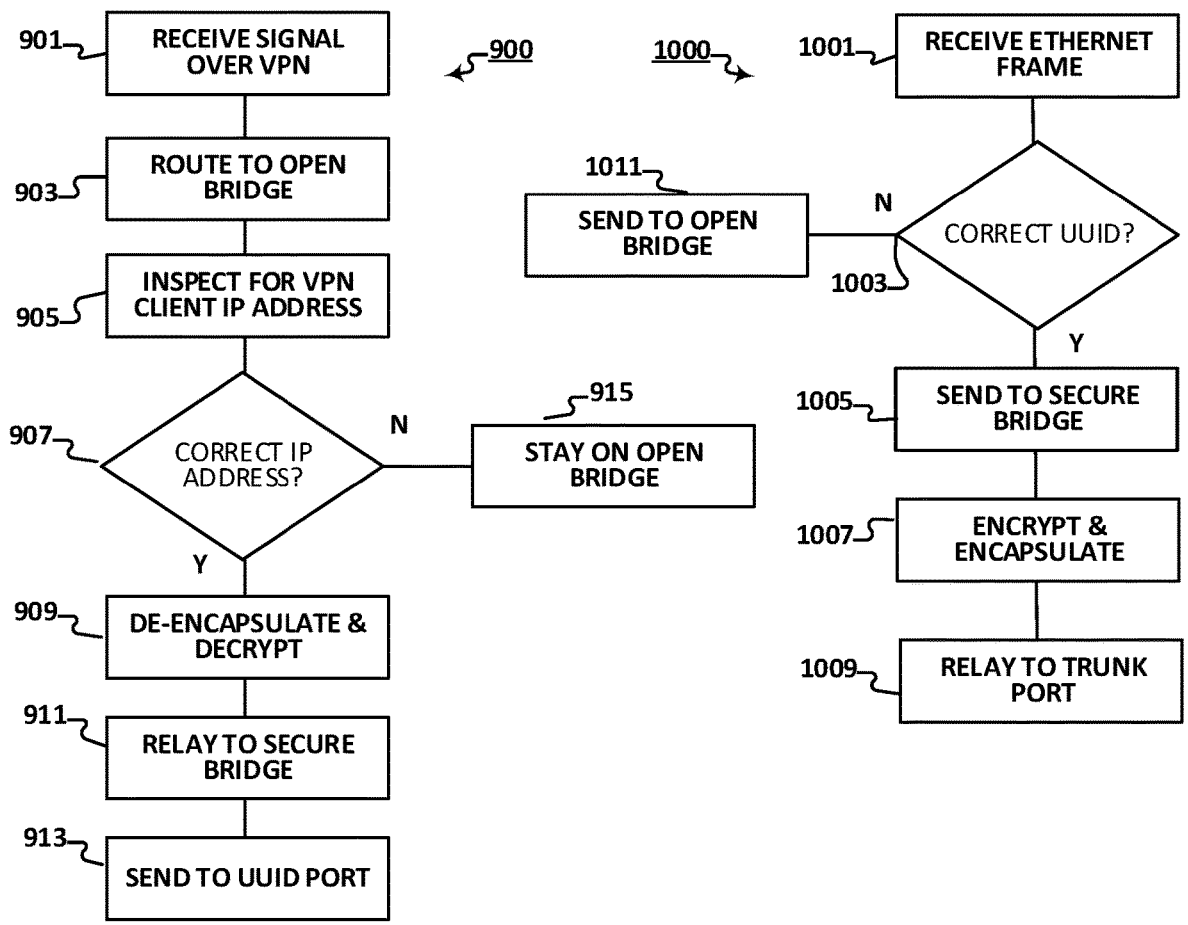
FIG. 9
FIG. 10

VIRTUAL PAYMENT SYSTEM AND METHOD FOR DISPENSING FUEL

CROSS-REFERENCE TO RELATED APPLICATIONS

This application claims priority to U.S. Provisional Application Ser. No. 62/774,389 filed Dec. 3, 2018.

BACKGROUND

Field

The present disclosure relates generally to fuel dispensing, and particularly, to fuel dispensing systems configured with serial data control signal wiring, and more particularly to fuel dispensing systems configured with a serial-to-ethernet converter.

Description of the Problem and Related Art

Referring to FIG. 1, a legacy system 100 for dispensing fuel and taking payment for fuel typically comprises one or more forecourt fuel dispensers 101a-n, the operation of which is controlled by a forecourt dispenser controller 103 ("FDC"). The FDC 103 is responsive to one or more point-of-sale devices 105 ("POS") through which the store logs payment for fuel. The one or more POS's 105 are connected to a store local area network ("LAN") 105 which is connected to a public network 117. The FDC 103 controls the dispensers 101a-n through a fuel distribution box 101 coupled to the FDC 103 via serial data line 109. The serial data conveyed over serial data 109 represents commands to the dispenser 101 in machine language and responses to such commands from the dispenser to the POS 105. Fuel distribution box 101 is a serial data hub for the forecourt dispensers 101a-n which are responsive to the fuel distribution box 101 through serial data lines 107a-n which are typically a two-wire, twisted pair, current loop.

A functional schematic for an exemplary implementation of a prior art current loop 201 is presented in FIG. 2 which includes a power source 203 coupled to a current driver 205. The purpose of the current loop is to control the operation of one or more devices, such operations include turning the devices on or off. Each device is configured with what is essentially a serial data transceiver 207a, b which receives serial data 202 from the FDC 103. Serial data 202 is conveyed by modulating current provided by the power source 203 according to the specific command the FDC sends to a device. Serial data 109 in the form of modulated current triggers a contact relay 209a, b in each device, which upon the closing of the circuit energizes an LED 211a, b. An optical detector 213a, b in the transceiver 207a, b detects light energy emitted from the LED 211a, b and issues a detection signal 204a, b to a device processor (not shown) where the signal is signal is demodulated and a command is transmitted to, for example, a dispenser actuator 215a, b. It will be appreciated that while two devices are illustrated on the current loop 201, more devices may be controlled by the loop 201. Indeed, in this example, Device 1 and Device 2 may each be fuel pumps that are part of a forecourt fuel dispenser 101. A single current loop 201 in the fuel dispensing application may control several such dispensers.

There are many drawbacks of a current loop system in the fuel dispensing context. The wires comprising the loops must be buried so that any fault, degradation, or breakage of the wire is costly, not to mention laborious, to repair. Further, the system requires numerous elements to work. For example, the current driver 205 is necessary to maintain the appropriate amount of current in the loop 201 and emergency electrical disconnect components must be incorporated in the loop 201. Further, because of voltage drops that occur with each device, the power source 203 must provide an adequate capacity to handle the cumulative load of the loop 201 and maintain consistent current which increases the risk of a shutdown of the distribution box due to overheating.

In addition, most modern fuel dispensers include card readers or other payment means allowing payment at the pump. Referring again to FIG. 1, payment serial data lines 109a-n are dedicated to conveying customer payment information when a customer pays for fuel at the dispenser 101 using a credit card, debit card, or the like. The FDC also controls payment processing from the dispensers 101a-n via another serial data line 121 which is coupled to a payment distribution box 103. Payment serial data is typically conveyed using an RS232 or RS485 serial data protocol, however, some systems may also employ current loop. As with the fuel distribution box 101, the payment distribution box 103 functions as a serial data hub. When a customer pays at the dispenser 101a-n, payment data, including customer identification, payment card (debit or credit), payment amount is transmitted from the forecourt dispenser controller 103 to the customer's bank or credit card issuer through the public network 117. A shortcoming of this configuration is credit or debit card information may be stolen since the serial data is unencrypted.

Moreover, such a system suffers from low data throughput and loss of data. Fuel dispensers include displays for advertising with everything from simple signs to running commercials complete with both video and audio. Some service stations have integrated fast-food or quick-serve restaurants, and the dispensers may allow the customer to order food from these restaurants. Additionally, the POS systems facilitate ordering other services, such as car washes, at the fuel dispenser, for not only fuel, but also any products or services ordered at the dispenser.

Attempts to provide broadband communication capability for fuel dispensers include the system and method described in U.S. Pat. No. 9,496,920 to Carapelli, et al., entitled Fuel Dispensing Environment Utilizing Retrofit Broadband Communication System. Carapelli, et al., teaches a retrofit system for providing high-bandwidth communication between forecourt dispensers and the store network. In essence, the distribution box combines low rate data (current loop) and high bandwidth data (DSL) and forces the combined data over the existing two-wire current loop.

U.S. Pub. App. No. 2011/0022223 entitled Retrofit Data Communication at Filling Stations, by Johnson, et al., which proposes using the pre-existing current loop for controlling the dispenser, but multiplexing payment side serial data (RS485) in the frequency domain with an ethernet signal, and, again, transmitting the combined signal across the legacy wiring where the combined signal is split using a de-multiplexer at the dispenser.

A similar example is found in U.S. Pub. App. No. 2009/0129403, Fueling Facility Communication, by Harwell et al. As with the previously discussed prior art, this system would also combine communication protocols (RS485 and ethernet) and transmit data across legacy wiring.

Of course, these proposed systems all suffer from the same drawback in that coupling a combined signal, i.e., serial data with ethernet data, over legacy wiring is ineffective because data rates are still low compared to modern network standards. To achieve higher data rates, datagrams must be split which increases the risk of lost data and retransmission. In addition, adding resistive loads to the existing current loop requires an increased current loop power source to maintain the system current, again leading to overheating. These designs also require a significant and costly re-configuration of the dispenser and in-store control system. Finally, none of these systems provide protection of customer payment data.

SUMMARY

For purposes of summary, certain aspects, advantages, and novel features are described herein. It is to be understood that not necessarily all such advantages may be achieved in accordance with any one particular embodiment. Thus, the apparatuses or methods claimed may be embodied or carried out in a manner that achieves or optimizes one advantage or group of advantages as taught herein without necessarily achieving other advantages as may be taught or suggested herein.

A system for facilitating payment for fuel dispensing includes a fuel dispenser associated with a current-loop-to-ethernet converter for receiving serial data from a fuel dispenser controller and converting said serial data to an ethernet signal and a network appliance coupled the current-loop-to-ethernet converter by an ethernet port. A virtual payment facilitator is connected to the network appliance over a virtual private network ("VPN") and to a payment authorization entity, also over a VPN.

According to one aspect, the payment authorization entity issues a request to dispense fuel to the virtual payment facilitator over the VPN as an application program interface ("API") which, when received, is decrypted, converted to a serial data signal, encrypted and re-encapsulated and transmitted to the network appliance. The network appliance receives data from the virtual payment facilitator over a VPN and relays decrypted ethernet frame signals comprising the data to the current-loop-to-ethernet converter. The current-loop-to-ethernet converter removes the ethernet frame and transmits the payload as serial data to the dispenser, typically commanding the dispenser to dispense fuel for a customer.

BRIEF DESCRIPTION OF THE DRAWINGS

The system and method are described with reference to the accompanying drawings. Additionally, the left-most digit(s) of a reference number identifies the drawing in which the reference number first appears.

FIG. 7 is a flowchart of one exemplary subprocess of the system performed by the current-loop-to-ethernet converter;

FIG. 8 is a flowchart of a second exemplary subprocess also performed by the current-loop-to-ethernet converter;

FIG. 9 is a flowchart of a first exemplary subprocess performed by the network appliance;

FIG. 10 is a flowchart of a second exemplary subprocess executed by the network appliance.

DETAILED DESCRIPTION

Figure 1:
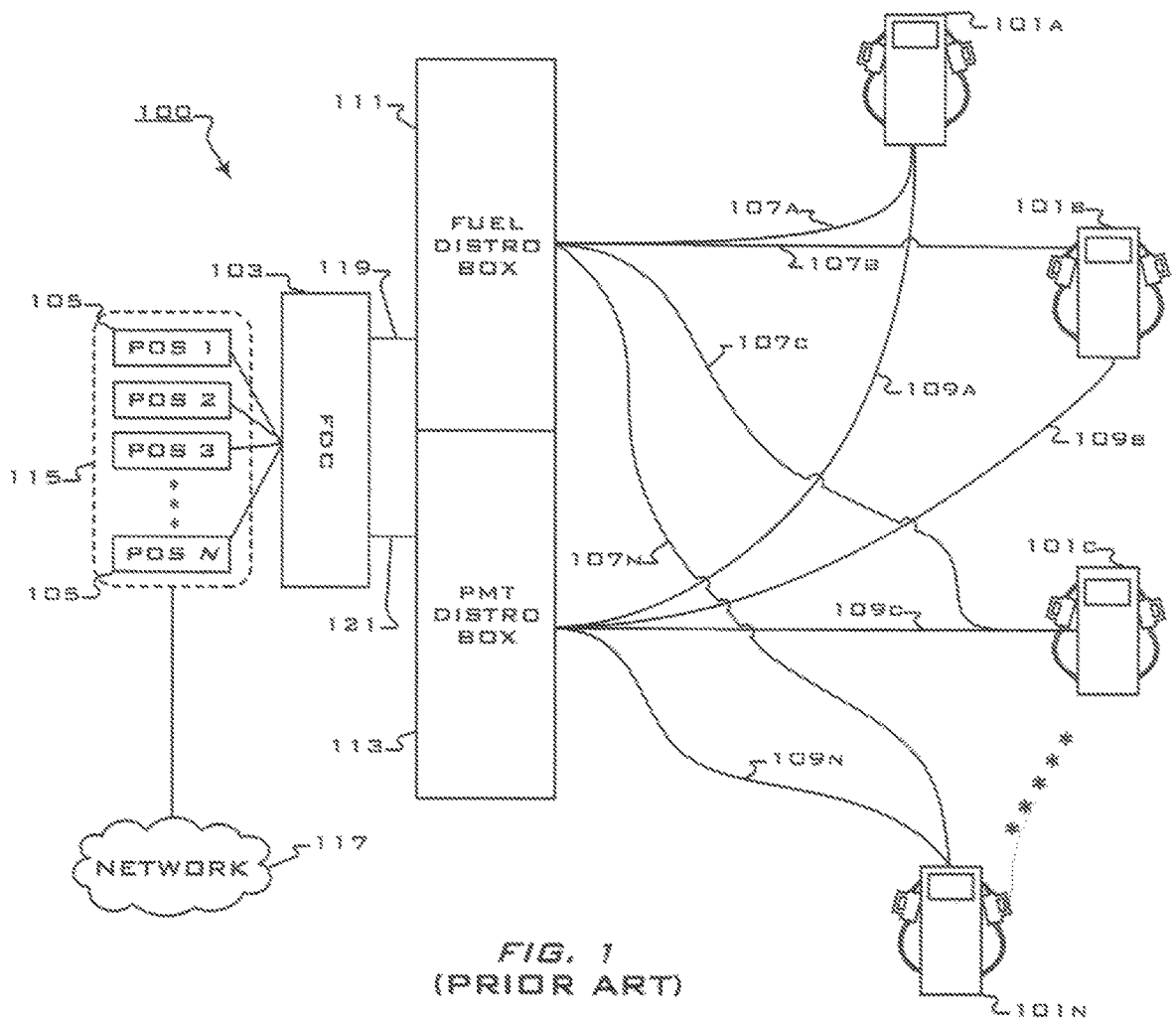
FIG. 1 illustrates a prior art control system for fuel dispensing.
Figure 2:
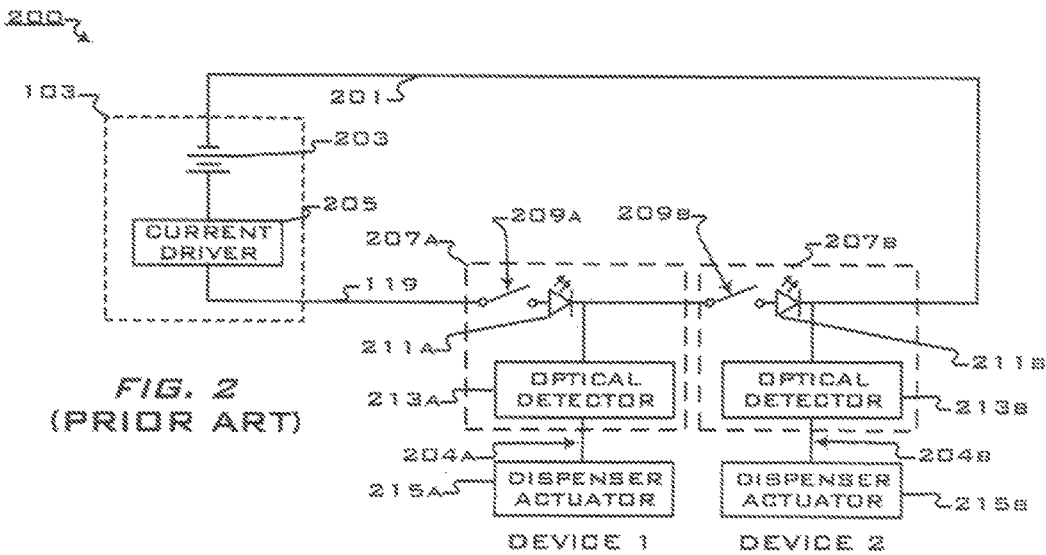
FIG. 2 depicts an exemplary system prior art current loop control system.

The various embodiments of the system and method and their advantages are best understood by referring to FIGS. 1 through 11 of the drawings. The elements of the drawings are not necessarily to scale, emphasis instead being placed upon clearly illustrating the novel features and principles of operation.

Furthermore, reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "In another embodiment," or variations thereof in various places throughout the specification are not necessarily all referring to its respective embodiment.

The terms used in describing various embodiments of this disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include". "comprise" and "have" as well as derivatives thereof, mean inclusion without limitation.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links (of possibly different speeds) that enable the transport of electronic data between computer systems and/or modules (e.g., hardware and/or software modules). When information is transferred or provided over a network or another communications connection (either hardwired, wireless, or a combination of hardwired or wireless) to a computer system, the connection is properly viewed as a computer-readable medium. Computer-executable instructions include, for example, instructions and data which cause a general-purpose computer system or special-purpose computer system to perform a certain function or group of functions. The computer executable instructions may be, for example, binaries, intermediate format instructions such as assembly language, or even source code.

Although not required, devices or systems described below are in the general context of computer-executable instructions, such as program modules, being executed by a computer. Generally, program modules include routines, programs, objects, components, data structures and the like that perform particular tasks or implement particular abstract data types. It should also be understood that the programs, modules, processes, methods, and the like, described are but an exemplary implementation and are not related, or limited, to any particular processor, apparatus, or processor language. Rather, various types of general-purpose computing machines or devices may be used with programs constructed in accordance with the teachings below. Similarly, it may prove advantageous to construct a specialized apparatus to perform the method steps described herein by way of dedicated processor systems with hard-wired logic or programs stored in nonvolatile memory, such as, by way of example, read-only memory (ROM), for example, components such as ASICs, FPGAs, PCBs, microcontrollers, or multi-chip modules (MCMs). Implementation of the hardware state machine so as to perform the functions described herein will be apparent to persons skilled in the relevant arts. Finally, it will be appreciated that many of the functions taught below may be performed using physical components and interfaces.

Figure 3:
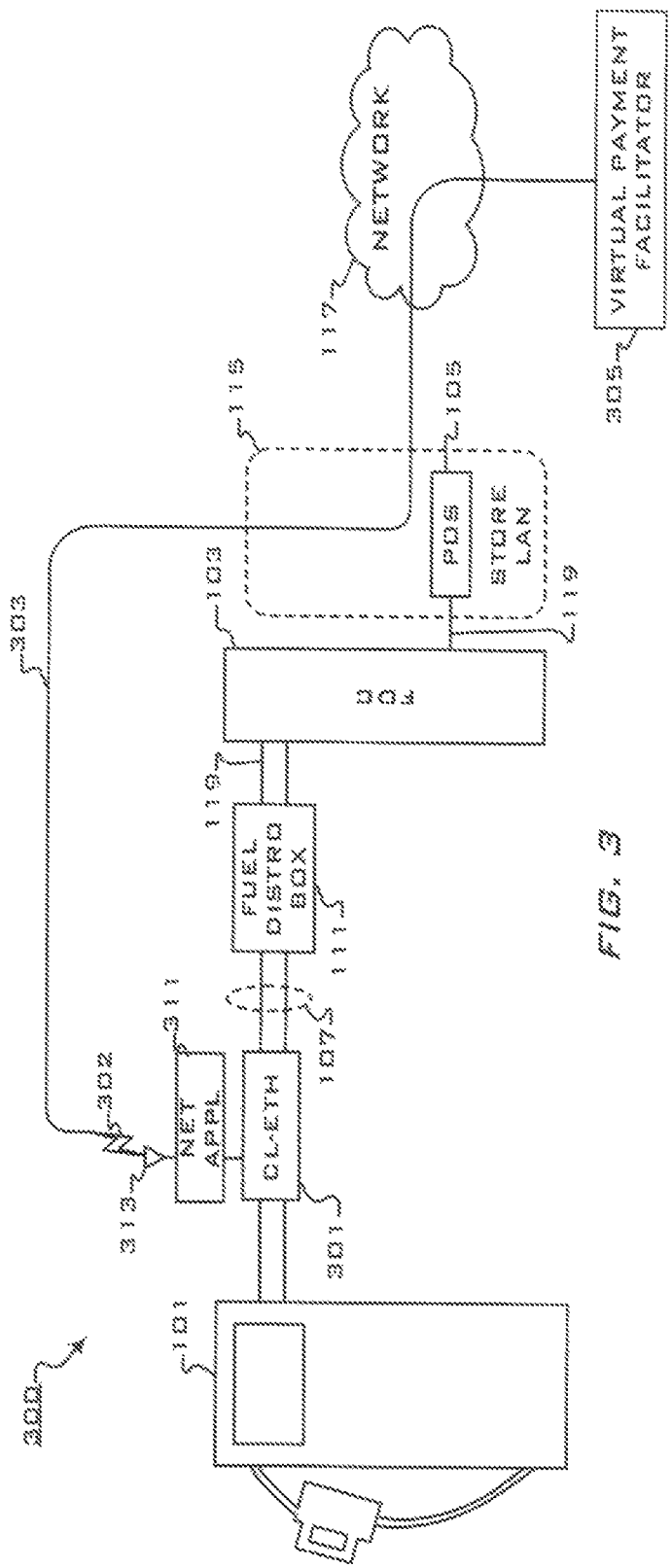
FIG. 3 presents a functional diagram of an exemplary fuel dispensing system in which communication between the store LAN and the dispensers is over a virtual LAN.

FIG. 3 illustrates an example of a novel system 300 for retrofitting a current loop system in a fuel dispensing context to enable secure broadband communication and control of fuel dispensers. In this first example, a current-loop-over-ethernet device ("CL-ETH") 301 is interposed between the FDC 103 and the dispenser 101 along the fuel dispenser current loop 307a. In the diagram, the CL-ETH 301 is depicted outside of the dispenser 101 for clarity. However, for ease of installation, the CL-ETH 301 may be installed within the dispenser 101. The CL-ETH 301 is coupled to a network appliance 311 which is responsive to a radio frequency transceiver 313. As will be described in greater detail below, the CL-ETH 301 basically intercepts serial data signals from the FDC 103 via the current loop 107 and converts them to an ethernet compatible signal. In this system 300, TCP/IP signals 302 can be transmitted from the CL-ETH 301 through the network appliance 311 to a virtual payment facilitator 305 through the store LAN 105 and the public network 117 over a VPN 303. Likewise, the CL-ETH 301 may also receive data signals from the virtual payment facilitator 305 over the VPN 303 as well. Such signals may include commands to the dispenser 101 associated with the CL-ETH 301 to, for example, commence dispensing, stop dispensing, and the like.

Figure 4:
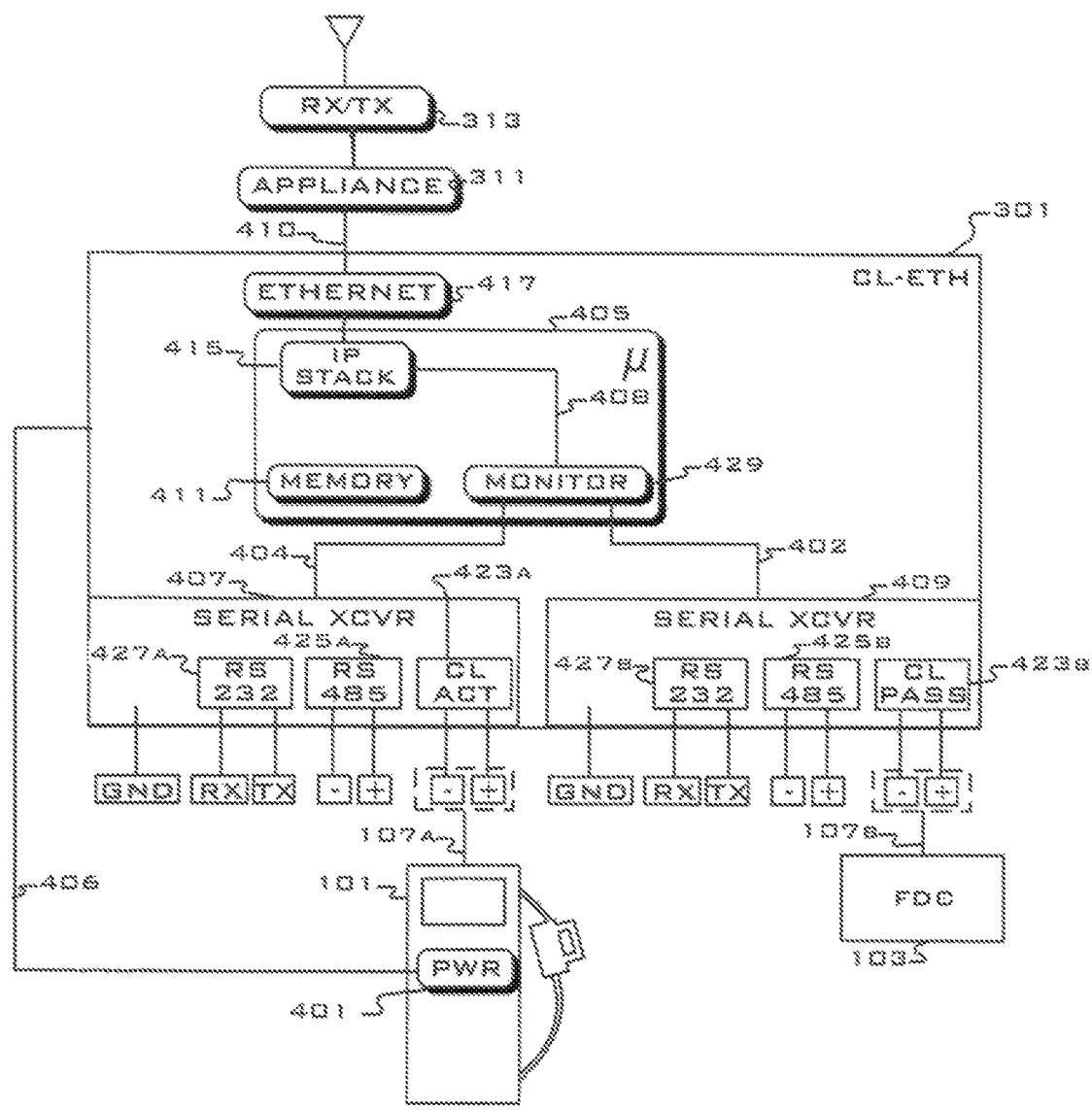
FIG. 4 is a functional schematic of an exemplary current-loop-to-ethernet converter

An exemplary CL-ETH 301 for use in the disclosed system is presented in FIG. 4. Serial data transmitted over current loop 107b from the FDC 103 via the fuel distribution box 111 (not shown in figure) is coupled to a first serial transceiver 409 that includes a passive current loop interface 423b. The serial transceiver 409 demodulates the incoming serial data and couples the demodulated signal 402 to a microcontroller 405 that comprises a memory 411 configured with control logic to cause the microcontroller 405 to execute the functions of the CL-ETH 301. Microcontroller 405 comprises a TCP/IP stack 415 and a serial data monitor module 429 which is coupled to the current loop interface 423b. Ethernet communication module 417 is coupled to the TCP/IP stack 415 and the network appliance 311. A second serial transceiver 407 is also coupled to the monitor module 429 and is also configured with a current loop interface 423a which is coupled to current loop 107a for transmitting serial data to the dispenser 101. The second serial transceiver 407 modulates a demodulated signal 404 from the monitor 429 and conducts it to an active current loop interface 423a which relays it to the dispenser 101. Optionally, serial transceivers 407, 409 may also include RS-232 interfaces 427a, b and RS-485 interfaces 425a, b. Power 406 for the CL-ETH 301 is supplied by the fuel dispenser 101 power supply 401.

In operation, the CL-ETH receives serial data, which is composed of a proprietary machine language unique to the model of dispenser, from the FDC 103 over current loop 307b through the passive current loop interface 423b. The serial interface 409 demodulates the serial data and couples the incoming demodulated signal 402 to the monitor module 429 within the microcontroller 405. The monitor sends an outgoing signal 404 to the dispenser is imparted to the second serial transceiver 407 where it is modulated and sent to the active current loop interface 423a is transmitted to the dispenser 101 via current loop 107a. Thus, control commands from the FDC to the dispenser 101 are relayed intact as if the CL-ETH 301 was not installed. In other words, the CL-ETH 301 does not impair the ability of the existing system's data activity to and from the POS 105, the FDC 103, and dispenser 101. This allows a transparent behavior during these existing system's communications to activate or deactivate a dispenser 101. At the same time, the monitor module 429 intercepts demodulated data 402 from the serial transceiver 409 and relays the data signal 408 to the TCP/IP stack where is it converted into a TCP/IP datagram. The TCP/IP stack also incorporates into the datagram the CL-ETH's universally unique identifier ("UUID") and then sends the datagram to the ethernet module 417 which encapsulates the datagram in an ethernet frame and conveys the encapsulated signal 410 to the network appliance 311. The network appliance 311 relays the ethernet frame signal 410 to the transceiver 313 for transmission to the store network 105, wirelessly or wired, over VPN 303, described below.

The CL-ETH 301 receives incoming signals from the virtual payment facilitator 305 over the VPN 303 via the transceiver 313 which routes the signals to the network appliance 311. The network appliance 311 processes the data signals and couples an ethernet data signal 410 to the ethernet module 417 which removes the ethernet frame and relays the signal to the microcontroller TCP/IP stack 415 where the incoming datagrams are stripped of TCP/IP information and released to the monitor 429 as a dispenser data signal 408. The dispenser data signal 404 is then coupled from the monitor 429 to the active current loop interface 423a in the second serial transceiver 407 which modulates the signal into a serial data signal and transmitted to the dispenser 101 on current loop 107a.

Figure 5:
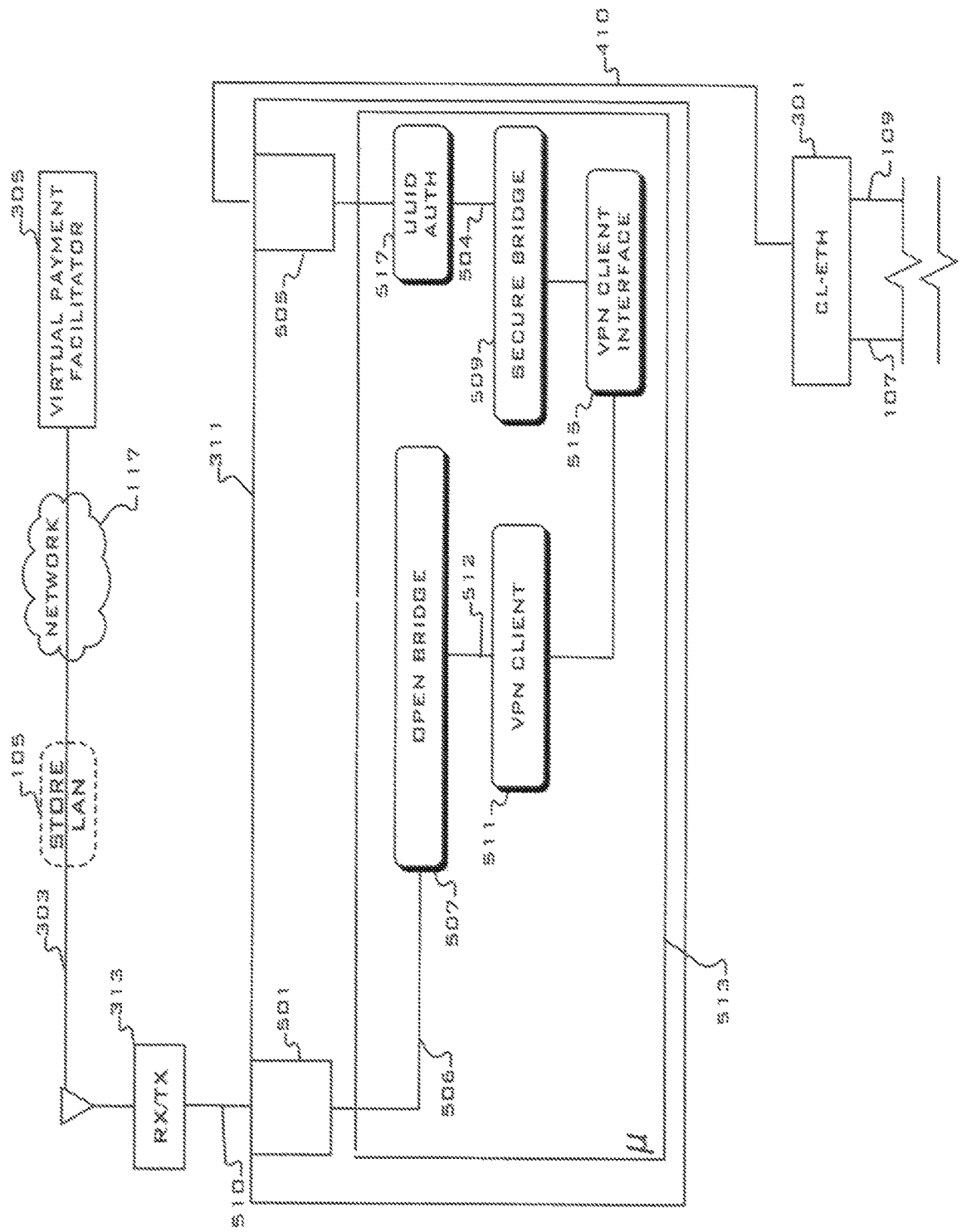
FIG. 5 is a functional diagram of an exemplary network appliance for use in the system depicted in FIG. 3.

The CL-ETH 301 is configured to issue and receive network data through a network appliance 311, shown in greater detail in FIG. 5, one example of which is found in the Mikrotik model RB951 programmable network appliance. Network appliance 311 may be a stand-alone component or may be housed within the CL-ETH 301. Network appliance 311 comprises a trunk port 501 coupled to transceiver 313 via an ethernet connection 510 which also powers the transceiver 313 via power-over-ethernet ("PoE"). A second port 505 is coupled to the CL-ETH 301 via an ethernet connection 410 and receives power through PoE. This port 505 is an ethernet interface that is a UUID self-authenticating port for the appliance 311.

The appliance 311 is further configured with a microcontroller 513 which is programmed with a first bridge software module 507, referred to herein as an "open bridge," coupled to the trunk port 501, as well as to the UUID port 505 via a UUID authenticator software module 517 residing in the microcontroller. A virtual private network ("VPN") client module 511 is coupled to the open bridge 507 and a VPN client interface module 515. The VPN client interface module 515 couples to a secure bridge 509 which is coupled to the UUID authenticator module 517. It will be appreciated that microcontroller 513 acts as a local host for the dispenser 101.

Data signals from the CL-ETH 301 are provided to the appliance 311 as ethernet data signals 410 through the UUID port 505. Signals from the UUID port 505 then encounter the UUID authenticator 517 which assesses whether the ethernet data signal 410 includes a valid device Layer 2 UUID address that matches the first six characters of the MAC address of the CL-ETH 301. Upon verifying a matching UUID, the UUID authenticator 517 routes the signal 504 to the secure bridge 509. The signal is then passed to the VPN client interface 515 where it couples the signal to the VPN client module 511. The VPN client module 511 incorporates an address of a VPN server comprised within the virtual payment facilitator 305, to be described in detail below, and encrypts and then encapsulates the data signal. It then transmits the encapsulated, encrypted VPN signal 512 to the open bridge 507 which conveys the outgoing signal 506 to the trunk port 501. The signal 510 emerges from the trunk port 501 and is transmitted by the transceiver 313, wired or wirelessly, to the store LAN 105 to the virtual payment facilitator 305 through the store LAN and the public network 117.

Signals back to the CL-ETH 301 associated with the dispenser 101 from the virtual payment facilitator 305 are transmitted over VPN 303 through the public network 117 and the store LAN 105 and are received at the transceiver 313. The incoming signals are conveyed to the appliance 311 via trunk port 501. Trunk port signals 506 are then received at the open bridge module 507. The VPN client 511 monitors packets received by the open bridge 507 and if it detects a packet with having the proper VPN address, the VPN client 511 receives the packet and decrypts the data, and then transmits the packet to the VPN interface 515. The VPN client interface 515 routes the signal to the secure bridge 509 where it is provided to the UUID port 505 for transmission back to the CL-ETH 301.

Figure 6:
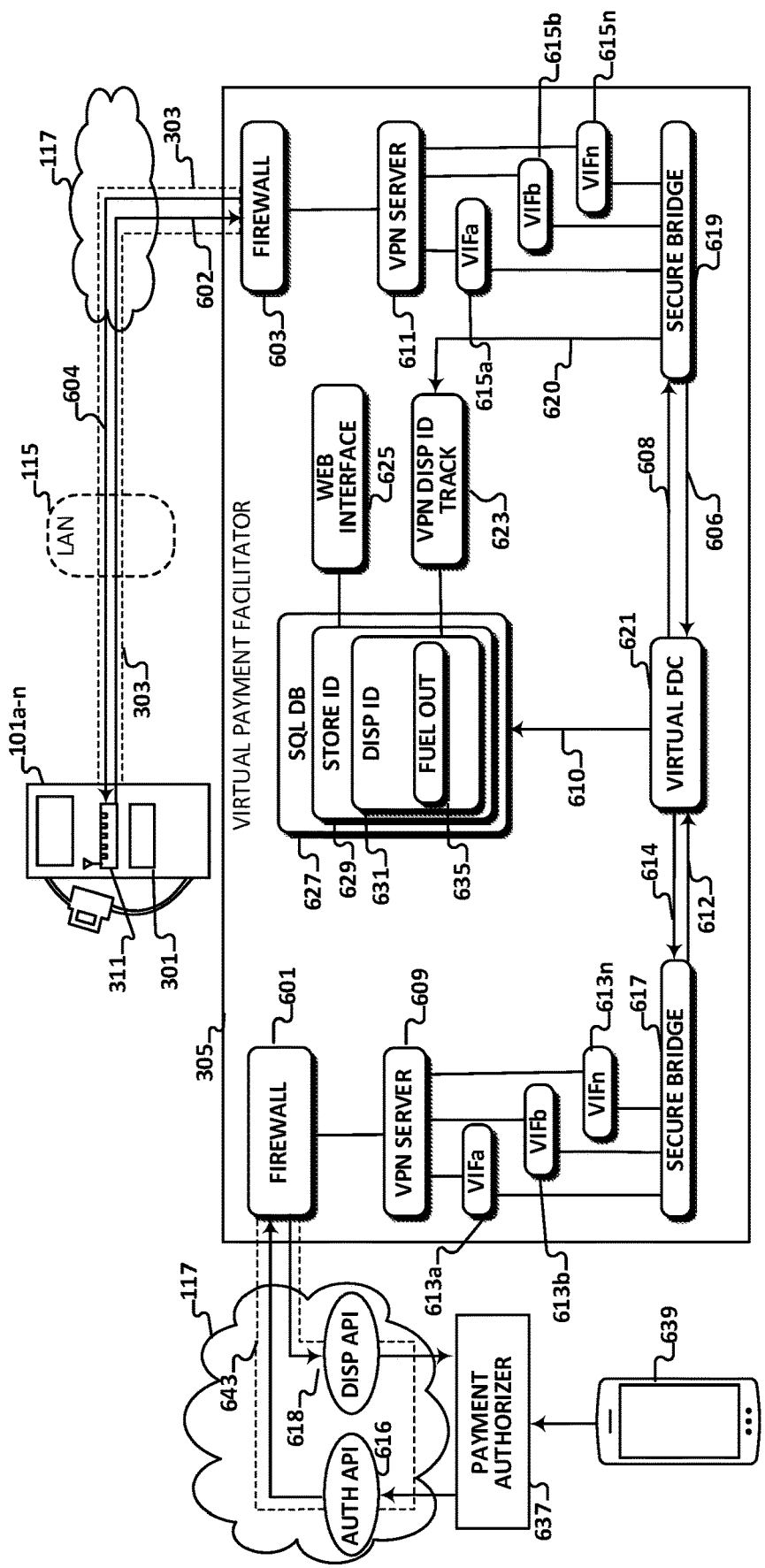
FIG. 6 presents an exemplary network architecture for payment for fuel over a virtual private network.

FIG. 6 depicts an exemplary network system wherein a plurality of dispensers 101a-n at a store are each configured with a CL-ETH 301 and an appliance 311. Each CL-ETH 301 in a dispenser 101a-n is connected over a VPN 303 established between the network appliance 311 and a VPN server 611 within the virtual payment facilitator 305 through a firewall 603. The virtual payment facilitator 305 is a virtual machine configured in a cloud-based system comprised of one or more computer systems. As such, elements and functions of the virtual payment facilitator 305 described herein are software modules stored in the cloud-based system memory and executed by the computer systems comprising the cloud-based facilitator system 305.

The virtual payment facilitator 305 is also configured with a firewall 603 and the VPN server 611. In one exemplary embodiment, the VPN server 611 establishes a VPN 303 with the network appliance 311 associated with each dispenser 101a-n through the public network 117 and the store LAN 105 using the IP address for the dispenser's network appliance 311. At the same time, a VPN interface instance 615a-n is created for each dispenser 101a-n that has established a VPN with the virtual payment facilitator 305 to act as an interface between the dispenser 101a-n and the virtual payment facilitator 305.

A database 627 is configured in the virtual payment facilitator 305 memory which stores data for store identification data 629, and the dispenser identification data 631 for all dispensers 101 associated with a store. Dispenser identification data 631 can be a dispenser identification numbers, a registration numbers identifying the network appliance 311 associated with the dispenser 101 and network appliance 311 IP addresses. Optionally, dispenser data 631 may include fuel data 635 representing the amount of fuel dispensed by the dispenser 101a-n. A web interface 625 is included in the virtual payment facilitator 305 to allow a store owner, i.e., user, to populate the database 627 with the data pertinent to that user, such as dispenser identification data 631.

A secure bridge 619 is coupled to the VPN server 611 through VPN client interface instances 615a-n, each of which are associated with an individual dispenser 101a-n. The secure bridge 619 also interacts with a virtual FDC module 621 which communicates with the database 627.

Advantageously, in one embodiment, the VPN server 611 may use a dynamic host configuration protocol ("DHCP") to dynamically assign VIN tunnel IP addresses to devices within the network. i.e., the network appliances 311. In such an embodiment, the network appliances 311 are configured to periodically send status messages to the VPN server 611. These status messages may include the unique network appliance registration number source IP address associated with that registration number. A VPN address tracking module 623 receives data from the secure bridge 619. The tracking module 623, therefore, monitors the DHCP addresses assigned by the VPN server 611 for each network appliance 311. The tracking module 623 looks up the dispenser identification data 631 in the database 627, retrieves the network appliance registration number detected in the packet as well as the source IP address corresponding to that number. If the IP addresses do not match, the tracking module 623 automatically updates the database 627 accordingly.

The virtual payment facilitator 305 is further configured with a payment side VPN server 609 connected to a payment side firewall 601. A payment secure bridge 617 interacts with the VPN server 609 through payment VPN interfaces 613a-n which are each associated with a payment authorizing entity 637. Nonlimiting examples of payment authorizing entities 637 include Amazon Pay, Google Pay, PayPal, and Apple Pay. The payment secure bridge 617 interfaces with the VFDC 621.

When a fuel customer desires to buy fuel at a dispenser 101, the customer may use an application (or "app") executed on a mobile computer device 639, the application being associated with a particular payment authorizing entity 637. Through the app 639, the customer may request to purchase an amount of fuel, either by requesting a payment amount limit or some unknown amount necessary to fill the fuel tank, and entering the dispenser location. In some embodiments, the customer may also specify the fuel grade or type. This request is sent to the payment authorizing entity 637 which then issues a fuel dispense authorization application program interface ("API") 616 comprising store and dispenser identification data, and the maximum limit to which payment is authorized. The fuel dispense authorization API 616 is transmitted over a VPN 643 established between the payment authorizing entity 637 and the payment VPN server 609 within the virtual payment facilitator 305 and is received at the payment firewall 601, conveyed to the VPN server 609. The VPN server 609 then decrypts the request A VPN interface instance 613a-n is created for each authorizing entity 637 that has a VPN connection with the facilitator 305 and each VPN interface 613a-n relays the decrypted request to the payment side secure bridge 617 which issues the decrypted request 612 to the VFDC 621. The VFDC 621 issues a query 610 to the database 627 to obtain the dispenser identification information and the corresponding network appliance 311 IP address from the dispenser data 631. The VFDC 621 also converts the API request 612 into a machine language data signal 608 which is unique to the dispenser model. The VFDC 621 then adds the network appliance 311 address returned from the database query corresponding to the dispenser identified in the request message 612, and transmits the machine language signal 608 to the secure bridge 619. The signal is routed to the VPN server 611 where it is encrypted and encapsulated and output as a fuel dispense command signal 604.

The VPN server 611 then issues the fuel dispense command signal 604 to the dispenser 101. At the dispenser 101, the signal is received at the transceiver 313 and the signal is processed by the network appliance 311 and the CL-ETH 301 as described above. In one example, a command to set fuel grade prices would be issued to the dispenser 101. The dispenser 101 would activate and the customer would be able to dispense the fuel up to the authorized amount specified in the dispense request.

When the maximum payment amount is reached, the dispenser 101 completes dispensing. A data signal 602 representing the volume of fuel dispensed, the fuel grade, and the total amount of money for the fuel dispensed is transmitted the CL-ETH 301 from the dispenser then through the network appliance 311 and over the VPN 303 established with the virtual payment facilitator 305 VPN server 611 which de-encapsulates and decrypts it. The decrypted signal is routed to the secure bridge 619 via VPN interface instances 615a-n corresponding to the dispenser 101a-n. The secure bridge 619 then relays the signal 606 to the VFDC 621. The VFDC 621 retrieves the data signal 606, which is, at this point, in machine language, and converts it into a mark-up language, such as XML. It generates a transaction complete API message 614 which is then passed on the payment secure bridge 617. This API comprises data that includes the volume of fuel dispensed data as well price data as noted above. This message is routed through the payment VPN server 609 which encrypts it and sends to the payment authorizing entity as a transaction complete API 618 over VPN 643 which tunnels through public network 117. The payment authorizing entity 637 receives the transaction complete API 618 and debits the customer's account accordingly.

A first subprocess 700 of the system 300 is executed by the CL-ETH 301, and is depicted in a flow chart shown in FIG. 7 starting with step 701 where the CL-ETH receives an ethernet frame from the network appliance. The ethernet frame is decapsulated and the payload is retrieved 703. The payload data is modulated to be compatible with the dispenser 101 communication protocol 705. At step 707, the modulated signal is then transmitted to the dispenser 101 and to the FDC 103. The CL-ETH 301 also performs the subprocess 800 shown in FIG. 8, where the CL-ETH 301 intercepts a demodulated serial data signal from the FDC 103 at step 801, encapsulates the packet in an ethernet frame at step 803 and adds TCP/IP address and the CL-ETH's UUID to the packet 805. The ethernet frame is then sent to the network appliance 311.

The network appliance 311 performs the subprocesses shown in FIGS. 9 & 10. Referring to FIG. 9, VPN signal processing 900 begins at step 901 by receiving an encapsulated VPN signal from the VPN server 611 in the virtual payment facilitator 305. At 903, the received VPN request is routed to an open bridge module 307, where the VPN client 511 inspects the signal for the correct IP address and UUID for the CL-ETH 301 at step 905. If the correct IP address is present 907, the open bridge module 307 routes the signal to the VPN client 511 at step 909. The VPN client de-encapsulates and decrypts the packet (step 909) and couples the packet signal to the secure bridge 509 at step 911, which conveys the signal (step 911) to the secure bridge 509 where it is coupled to the UUID port 605 at step 913. If the incoming signal does not include the correct IP address and UUID for the CL-ETH 301, the packet signal remains on the open bridge module 307 with no further processing 915. The subprocess 1000 performed by the network appliance 311 when receiving data from the CL-ETH 301 starts with step 1001, receiving an ethernet frame signal 410 through UUID port 605. The ethernet frame signal 410 is checked at step 1003 to determine whether it includes the correct UUID) for the CL-ETH 301. If the signal does include the correct UUID), the signal is sent to the secure bridge 509 at step 1005. Then it is encrypted and encapsulated by the VPN client 511 at step 1007 and the encapsulated and encrypted signal is relayed, at step 1009, to the trunk port 601. If the signal does not contain the correct UUID, at step 1011, the signal is sent to the open bridge without further processing.

Figure 11:
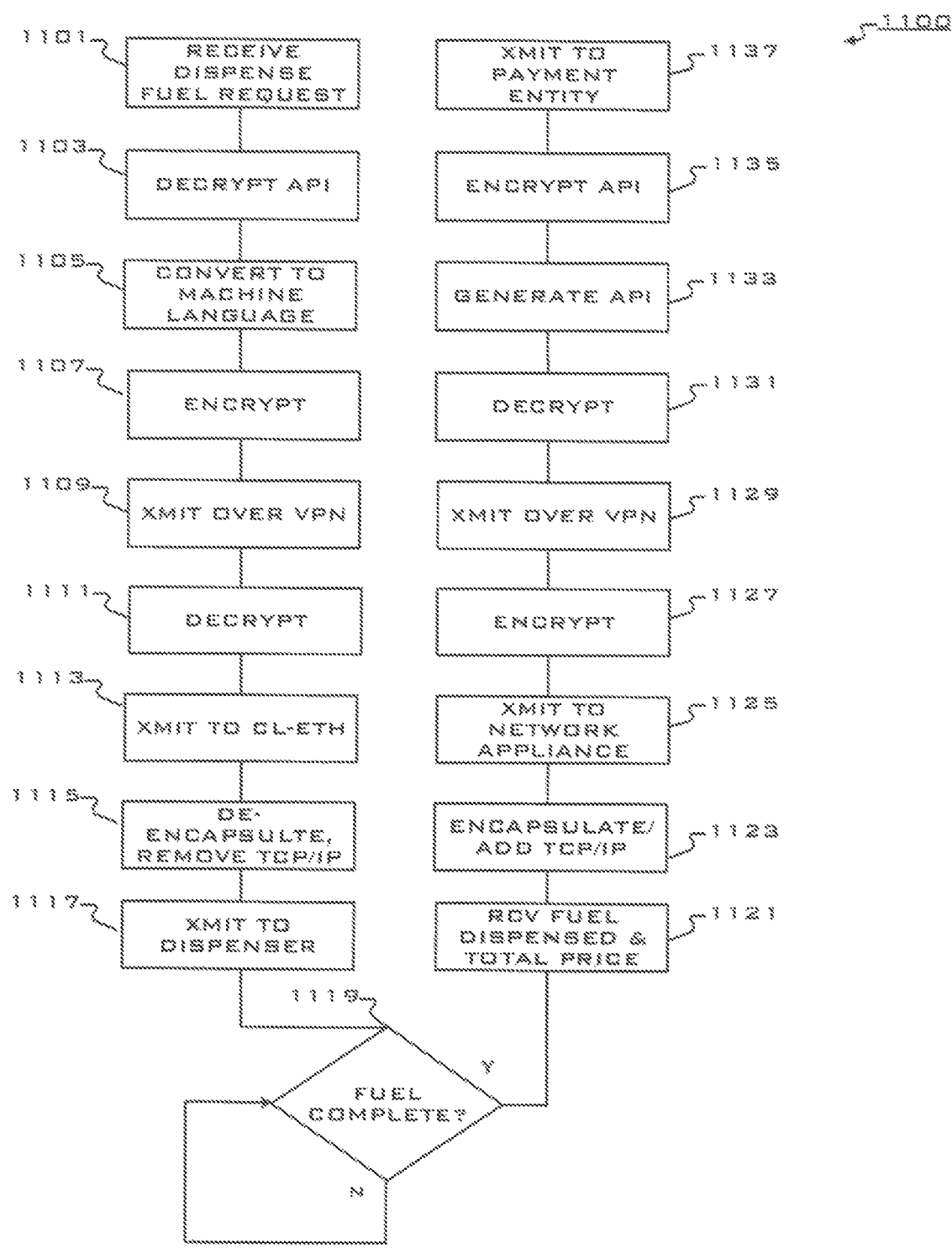
FIG. 11 depicts an exemplary process virtual performed by the system for dispensing and receiving payment for fuel.

FIG. 11 is a flowchart of a process 1100 executed by the system 300, beginning with receiving a dispense fuel request 1101 at the virtual payment facilitator 305 from a payment authorizing entity 637 where the request designates a dispenser 101. Step 1103 is for decrypting the request API signal at the payment VPN server 609, then at step 1105, the dispense fuel API request is converted into machine language by the VFDC 621. At step 1107, the request message is encrypted and encapsulated by VPN server 611 and is sent over the VPN 303 to the network appliance 311 associated with the designated dispenser 101 at step 1109. The network appliance 311 decrypts the request signal 1111 and transmits it to the CL-ETH 301, at step 1113, as an ethernet frame signal. Step 1115 has the CL-ETH 301 converting the request ethernet frame signal into a serial data signal and de-encapsulating it and removing the TCP/IP address. The serial data signal is then transmitted to the dispenser 101 at step 1117.

When the dispensing is completed 1119, the dispenser 101 issues a fueling complete signal in serial data to the CL-ETH 101 at step 1121 where the signal includes the amount of fuel dispensed and the total price. CL-ETH 101 encapsulates the serial data signal into an ethernet frame signal and adds a TCP/IP address 1123, then the network transmits a signal to the network appliance 311 at step 1125 where the signal is encrypted 1127. At step 1129 the encrypted signal is transmitted to the virtual payment facilitator 305 via over the VPN 303. The virtual payment facilitator 303 decrypts the VPN signal at step 1131, and converts the machine language signal into an API 618 at step 1133. The signal comprising the API 618 is encrypted 1135 and transmitted over the VPN 1137 to the payment authorizing authority 637.

As described above and shown in the associated drawings, the present disclosure is directed to a virtual payment system and method for dispensing fuel. While particular embodiments have been described, it will be understood, however, that any invention appertaining to the system described is not limited thereto, since modifications may be made by those skilled in the art, particularly in light of the foregoing teachings. It is, therefore, contemplated by the appended claims to cover any such modifications that incorporate those features or those improvements that embody the spirit and scope of such invention.

What is claimed is:

1. A system for facilitating payment for fuel dispensing comprising:
   a fuel dispenser, said fuel dispenser being associated with a current-loop-to-ethernet converter for receiving serial data from a fuel dispenser controller and converting said serial data to an ethernet signal and a network appliance coupled to said current-loop-to-ethernet converter by an ethernet port; and
   a remote virtual payment facilitator, said virtual payment facilitator comprising:
      a first virtual private network server configured to communicate over a first virtual private network through a public network with said network appliance;
      a second virtual private network server configured to communicate over a second virtual private network through a public network with a payment authorization entity; and
      a virtual forecourt dispenser controller responsive to said first and second virtual private network servers, said virtual forecourt dispenser configured to issue fuel dispensing commands to said fuel dispenser over said first virtual private network.

2. The system of claim 1, wherein said virtual forecourt dispenser is configured to generate an application program interface message.

3. The system of claim 1, wherein said virtual payment facilitator further comprises first and second firewalls for preventing unauthorized access to said facilitator over said public network.

4. The system of claim 1, wherein said virtual private network servers execute a dynamic host configuration protocol.

5. The system of claim 1, wherein said virtual payment facilitator is configured with a database, said database configured to store data comprising fuel dispenser identification data.

6. The system of claim 5, wherein said database if further configured to store fuel dispenser identification data and fuel volume data.

7. The system of claim 6, wherein said virtual private network servers execute a dynamic host configuration protocol.

8. The system of claim 7, wherein said virtual payment facilitator further comprises an IP address tracking module coupled to said first virtual private network server, said tracking module configured to retrieve said fuel dispenser identification data from said database and compare said data to an IP address embedded within a signal received by said first virtual private network server and to update said database based upon the comparison.

9. The system of claim 1, wherein said current-loop-to-ethernet converter comprises a monitor module for intercepting serial data received by the current-loop-to-ethernet converter and relaying said serial data to one of an ethernet module and said dispenser.

10. A method for facilitating payment for fuel, said method comprising the steps of:
   receiving a fuel dispense request at a remote virtual payment facilitator from a payment authorization entity over a first virtual private network, said virtual payment facilitator comprising a virtual forecourt dispenser controller, and said request comprising data identifying a fuel dispenser;
   issuing a command from said virtual payment facilitator via said virtual forecourt dispenser controller to said dispenser to dispense fuel, said command issued over a second virtual private network established directly between said virtual payment facilitator and said dispenser;
   receiving a signal from said dispenser at said virtual payment facilitator over said second virtual private network, said signal indicating fuel dispensing is complete; and
   transmitting an application program interface message over said first virtual private network from said virtual payment facilitator to said payment authorization entity, said message indicating fuel dispensing is complete.

11. The method of claim 10, wherein said step of receiving a fuel dispense request comprises the steps of:
   decrypting said fuel dispense request;
   identifying said dispenser; and
   converting said request into a first machine language signal.

12. The method of claim 11, wherein said step of issuing a command to said fuel dispenser comprises the steps of:
   encrypting a second machine language signal;
   sending said encrypted second machine language signal to said fuel dispenser;
   decrypting said encrypted second machine language signal at said fuel dispenser;
   converting said request into a serial data signal; and
   issuing said serial data signal to said fuel dispenser.

13. The method of claim 10, wherein said step of receiving a signal from said dispenser indicating fuel dispensing is complete comprises the steps of:
   receiving an encrypted third machine language signal from said fuel dispenser;
   decrypting said encrypted third machine language signal;
   converting said decrypted third machine language signal into an application program interface message indicating fuel dispensing is complete.

14. The method of claim 10, wherein said step of transmitting an application program interface message comprises the step of encrypting said application program interface message.

15. The method of claim 10, wherein said signal received from said dispenser at said virtual payment facilitator comprises data representing at least one of volume of dispensed fuel and fuel price.

* * * * *

UNITED STATES PATENT AND TRADEMARK OFFICE
CERTIFICATE OF CORRECTION

| | |
|---|---|
| PATENT NO. | : 11,443,582 B2 |
| APPLICATION NO. | : 16/702408 |
| DATED | : September 13, 2022 |
| INVENTOR(S) | : Michael Derby et al. |

It is certified that error appears in the above-identified patent and that said Letters Patent is hereby corrected as shown below:

On the Title Page

Item (12) delete "Derby" and insert --Derby et al--

Item (72) Inventors read:
Michael Derby, Madison, AL (US)

Should read:
--Michael Derby, Madison, AL (US);
Jason Hennig, Regina, (CA)--

Signed and Sealed this
Twenty-first Day of February, 2023

Katherine Kelly Vidal
*Director of the United States Patent and Trademark Office*